United States Patent

Forster

[15] 3,679,710

[45] July 25, 1972

[54] METHOD OF ISOMERIZING 4-CYCLOHEXENE-1,2-DICARBOXYLIC ACID ANHYDRIDES

[72] Inventor: Wolfgang C. Forster, Middletown, N.Y.

[73] Assignee: Reichhold Chemicals, Inc., White Plains, N.Y.

[22] Filed: May 18, 1970

[21] Appl. No.: 38,480

[52] U.S. Cl. ............................. 260/346.3, 252/428, 252/432
[51] Int. Cl. ....................................................... C07c 61/24
[58] Field of Search ................................................ 260/346.3

[56] References Cited

UNITED STATES PATENTS 2,959,599    11/1960    Bailey........................260/346.3

FOREIGN PATENTS OR APPLICATIONS 124,055    8/1967    Czechoslovakia

OTHER PUBLICATIONS

Fujiki et al., Chem. Abstracts (1970) vol. 72, 3113m. Date of original German Offen. 1,902,095 Oct. 2, 1969

*Primary Examiner*—Alex Mazel
*Assistant Examiner*—Bernard Dentz
*Attorney*—Munson H. Lane and Munson H. Lane, Jr.

[57] ABSTRACT

A method for preparing liquid mixtures of isomers of both the cis and trans forms of 4-cyclohexene-1,2-dicarboxylic anhydride and its nuclear alkyl derivatives and resulting product. These liquid mixtures are prepared by isomerizing the anhydride with a catalyst consisting of boric acid and oxalic acid, at temperatures between about 65° C. and about 185° C. This procedure permits the use of mild reaction conditions and yields a product having improved color, less by-products and low viscosity as compared to products prepared by heretofore known methods.

2 Claims, No Drawings

METHOD OF ISOMERIZING 4-CYCLO-HEXENE-1,2-DICARBOXYLIC ACID ANHYDRIDES

This invention relates to a method for preparing liquid mixtures of isomers of both the cis and trans forms of 4-cyclohexene-1,2-dicarboxylic anhydride and its nuclear alkyl derivatives and to the resulting product. These liquid mixtures are prepared by isomerizing the anhydride with a catalyst consisting of boric acid and oxalic acid, at temperatures between about 65° C. and about 185° C. This procedure permits the use of mild reaction conditions and yields a product having improved color, less by-products and low viscosity as compared to products prepared by heretofore known methods.

This invention relates to a method for producing liquid isomer mixtures of cis and trans forms of 4-cyclohexene-1,2-dicarboxylic anhydride and its nuclear alkyl derivatives. The term 4-cyclohexene-1,2-dicarboxylic anhydride denotes both the cis and trans forms.

The starting material, 4-cyclohexene-1,2-dicarboxylic anhydride and its nuclear alkyl derivatives are usually obtainable by the Diels-Alder reaction between maleic anhydride and 1,3-butadienes. In general, they are solids at room temperature. For example, 4-cyclohexene-1,2-dicarboxylic anhydride is the Diels-Alder adduct of maleic anhydride and 1,3 butadiene, and has a melting point of about 100° C.; 4-methyl-4-cyclohexene-1,2-dicarboxylic anhydride is the adduct of maleic anhydride and isoprene and has a melting point of about 63° C. These anhydrides are valued as hardeners for epoxy resins. More desirable, however, are anhydrides that are liquids at room temperature because of their better handling characteristics.

While methods have been known for isomerizing the solid anhydrides to their liquid state, the shortcomings of the known processes have been a serious obstacle for broader application. It has been known to isomerize the solid anhydrides by heating them in the presence of ruthenium or palladium catalysts. The high cost of these noble metals and the difficult recovery has rendered this method impractical. It has further been known to employ catalysts selected from a group consisting of phosphoric acid, sulfuric acid, their anhydrides, chlorosulfonic acid, phosphorus oxychloride, phosphorus pentachloride or sodium bisulfate. This latter method is likewise costly because of the lengthy processing time. Heating periods of from 5 hours to 84 hours are required causing partial decarboxylation. In addition to being costly the reaction product itself is very dark and has to be purified by distillation, and last but not least, the catalyst is highly corrosive, rendering the manufacture in stainless steel equipment very difficult. Therefore, there has been an urgent need for a more economic process that would eliminate the shortcomings heretofore experienced.

It is an object of this invention to produce a liquid mixture of isomers of anhydrides from 4-cyclohexene-1,2-dicarboxylic anhydride and its nuclear alkyl derivatives through the use of a special catalyst system.

It is also an object of this invention to produce a liquid mixture of anhydrides from 4-cyclohexene-1,2-dicarboxylic anhydride and nuclear alkyl derivatives thereof by a novel isomerization process permitting lower reaction temperatures and shortened reaction time.

It is a further object of this invention to produce a liquid mixture of anhydrides from 4-cyclohexene-1,2-dicarboxylic anhydride and nuclear derivatives thereof by a novel isomerization process that can be conducted in glass as well as in stainless steel equipment, yielding a product having better color, lower viscosity and containing less by-products.

It has now been discovered that these objectives can be attained by using as an isomerization catalyst system:
A. boric acid, or boron oxide ($B_2O_3$) plus
B. oxalic acid, either anhydrous or in the form of its dihydrate. With this catalyst system, the following advantages are gained in the isomerization of 4-cyclohexene-1,2-dicarboxylic anhydride and its nuclear alkyl derivatives:
1. low isomerization temperatures may be employed thus avoiding dimerzation as well as decarboxylation,
2. much less reaction time is required,
3. the catalyst system is non-corrosive so that the process can be conducted in stainless steel equipment,
4. the reaction product is purer, has a better color and a lower viscosity,
5. the level of catalyst can be held very low, facilitating catalyst removal after isomerization is completed.

By the method of this invention 4-cyclohexene-1,2-dicarboxylic anhydride and its nuclear derivatives can be made to undergo a double bond shift by heating them at from about 65° C. to about 185° C., preferably between 80° to 130° C. for an average period of time ranging from about 10 minutes to about 30 minutes, depending on the amount of catalyst used, in the presence of a catalyst blend of boric acid and oxalic acid dihydrate. Isomerization time may be longer if extremely small quantities of catalyst are used. This is indeed surprising since prior art teaches that the time needed for isomerization varies, both with the catalyst used and its concentration, from about a few hours to about 84 hours. It is also surprising that not only is a much shorter reaction time needed than was previously thought necessary but that a much lower reaction temperature can be used, being in the range of from about 65° C. to about 185° C.

In the practice of this invention the catalyst used is a blend of (A) boric acid and (B) oxalic acid or oxalic acid dihydrate. Ideally each acid, (A) and (B), is present in equal amounts by weight, based upon the weight of the anhydride used. The minimum amount of (A) that may be effectively used ranges from about 0.0066 percent, based upon the weight of the anhydride used, to about 2 percent. The minimum amount of (B) that may be effectively used ranges from about 0.0066 percent, based upon the weight of the anhydride used, to about 2 percent. Greater amounts of either (A) or (B) alone may be used with little or no effect upon the activity of the catalyst blend, as long as the above minimum amounts of 0.0066 percent of each are used. The catalyst blend is prepared by simply mixing the desired amounts of (A) and (B) together and adding the mixture to the anhydride or adding (A) and (B) separately. Superior results are obtained when the amounts of (A) and (B) used each ranges from about 0.01 percent to about 2 percent based upon the weight of the anhydride used. The catalyst blend is equally effective in glass equipment as in stainless steel equipment.

The temperature used for the isomerization may range from about 65° C. to about 185° C. and the preferred range is from about 80° C. to about 130° C. However, superior results are obtained within a range of from about 100° C. to about 120° C.

Higher temperatures may be used but are not deemed necessary and indeed may be harmful as the color will suffer and by-products may be formed.

An inert gas atmosphere may be used during this reaction. This gas may be selected from any of those being well known to the art such as: nitrogen, $CO_2$ and the like and mixtures thereof.

The liquid isomer mixtures produced by the practice of this invention are lower in viscosity than those produced by previous processes indicating the absence of dimer byproduct, have higher acid numbers which indicate absence of decarboxylation and have excellent color. Also there is no corrosion problem with this catalyst blend and therefore no danger from handling or storing corrosive materials.

In a typical practice of this invention 4-methyl-4-cyclohexene-1, 2-dicarboxylic anhydride, the Diels-Alder adduct of maleic anhydride and isoprene, is charged into a 3-neck glass flask. The charge is then heated under an $N_2$ blanket to from about 100° C. to about 120° C., whereupon the catalyst blend is added. Reaction conditions are maintained until the melt point of the reaction product is below about 20° C. At this point magnesium silicate is added as an acid acceptor, stirred for a short period of time and then is filtered hot. The product is now ready for use.

The following examples are illustrative only and are not to limit this invention in either spirit or scope.

Examples 1 and 2 are for comparison purposes and illustrate the prior art.

EXAMPLE 1

To a 2,000 ml pyrex flask were charged 1,000 grams of 4-methyl-4-cyclohexene-1,2-dicarboxylic anhydride and 1.18 grams of 85 percent phosphoric acid (0.1 percent). The charge was heated to 180° C. under a blanket of nitrogen. Samples were withdrawn periodically and checked for melting point. After 8 hours, the melting point had dropped to 22° C., indicating sufficient isomerization. The reaction product was stirred with 10 grams of Magnesol DCG (a magnesium silicate, used for removing the acidic catalyst, and manufactured by Waverly Chemical Co., Inc., Mamaroneck, N.Y.) at 110° C. for 1 hour and filtered. The final product has a color of 5 (Gardner), and an acid number of 648 (mg KOH per gram sample), a viscosity of 140 cps at 250° C. and a melting point of 21°–22° C.

EXAMPLE 2

The experiment described in example 1 is repeated except that the reaction is conducted in a 314 stainless steel reactor. Even after heating the charge for 20 hours at 180° C., no isomerization to the liquid state had taken place. The phosphoric acid level had to be increased to 0.5 percent in order to effect isomerization. It took 5 hours heating at 180° C. to decrease the melting point to 23° C. The reaction mixture was treated with Magnesol DCG as described above, and filtered. The final product was a very dark liquid, color was 14 (Gardner), the acid number was 647, the viscosity 200 cps at 25° C., and the melting point 22° C.

In both examples 1 and 2, the lower than theoretical values of acid numbers are indicative of decarboxylation because of the high temperatures required. Vacuum distillation of samples yielded 8 to 10 percent of a tarry residue having a molecular weight of about 300 (dimer).

EXAMPLE 3

To a 200 ml Pyrex flask were charged 1,000 grams of 4-methyl-4-cyclohexene-1,2-dicarboxylic anhydride and 5 grams (0.5 percent) of oxalic acid dihydrate. The charge was heated under a blanket of nitrogen to 110° C. After 10 hours, no isomerization had occurred. Then its temperature was raised to and held at 180° C. Again, no isomerization took place regardless of length of heating period.

The same experiment conducted in a stainless steel reactor lead to the same negative result, i.e., oxalic acid by itself is ineffective.

EXAMPLE 4

To a 2,000 ml Pyrex flask were charged 1,000 grams of 4-methyl-4-cyclo hexene-1,2-dicarboxylic anhydride and 5 grams (0.5 percent) of boric acid. Isomerization of the charge was attempted at temperatures ranging from 65° to 200° C. No isomerization took place. The same experiment conducted in a stainless steel reactor produced the same negative result, i.e., boric acid by itself is ineffective.

EXAMPLE 5

To a 2,000 ml Pyrex flask were charged 1,000 grams of 4-methyl-4-cyclohexene-1,2-dicarboxylic anhydride, 5 grams of oxalic acid dihydrate, and 5 grams of boric acid. The charge was warmed to 70° C. Within half an hour, the melting point had dropped to 4° C. Twenty grams of Magnesol DCG were added, the mixture stirred at 110° C. for 1 hour and filtered. The properties of the final product were: Color: 9 (Gardner), acid number: 673, viscosity: 85 cps at 25° C., melting point: 4° C., vacuum distillation yielded less than 3 percent of tarry byproduct.

EXAMPLE 6

The experiment as described in Example 5 was repeated in a 314 stainless steel reactor. The isomerization took place within one-half hour at 70° C. and the properties of the final product were practically the same as in Example 5.

EXAMPLE 7

To a 2,000 ml Pyrex flask were charged 1,000 grams of 4-methyl-4-cyclohexene-1,2-dicarboxylic anhydride. The charge was heated up to and held at 110° C. At this point 0.27 grams (0.025 percent) of boron oxide ($B_2O_3$) and 0.27 grams (0.027 percent) of anhydrous oxalic acid were added. Within one-fourth hour, isomerization was completed; the melting point has dropped to 16° C. 10 grams of Magnesol DCG were added, and the mixture stirred at 100° C. for 1 hour. The product was filtered. Properties of final products were as follows: Color: 7–8 (Gardner), acid number: 671, viscosity: 80 cps at 25° C., melting point: 15°–16° C., vacuum distillation residue amounted to less than 3 percent.

EXAMPLE 8

To a 60 gal. reactor made of 314 stainless steel, equipped with agitator, reflux condenser and jacket for heating and cooling, was charged 291 lb. of maleic anhydride. The charge was melted, under a blanket of carbon dioxide, and the temperature raised to 68° C. Over the next 4 hours, 209 lbs. of isoprene (4 percent excess) were gradually added at 68°–72° C., while the exothermic heat was removed by external cooling.

The temperature was raised to 110° C., and 30 grams of oxalic dihydrate (0.0134 percent), and 30 grams of boric acid (0.0134 percent) were added. After ½ hour isomerization time at 110° C., the melting point had decreased to 16° C. Two lbs of Magnesol were added, and the mixture was stirred at 110° C. for 1 hour. The mixture was filtered, and a yield of 497 lb. of liquid anhydride was obtained. The properties were: Color: 3 (Gardner), acid number: 673, viscosity: 75 cps at 25° C, melting point: 15°–16° C. Vacuum distillation residue was less than 3 percent.

EXAMPLE 9

To a 2,000 ml Pyrex flask were charged 1,000 grams of 4-methyl-cyclohexene-1,2-dicarboxylic anhydride. The charge was heated, under an inert gas blanket, to 110° C. A mixture of 0.066 grams of oxalic acid dihydrate (0.0066 percent) and 0.066 grams of boric acid (0.0066 percent) was added. After 4 hours, heating at 110° C., the melting point had dropped to 19° C., indicating satisfactory isomerization. The product was used without further purification. Properties of the final product were: Color: 4 (Gardner), acid number: 673, viscosity: 78 cps at 25° C., melting point: 18°–19° C.

EXAMPLE 10

To a 2,000 ml Pyrex flask were charged 1,000 grams of 4-cyclohexene-1,2-dicarboxylic anhydride (adduct of 1,3-butadiene and maleic anhydride), 4 grams of boric acid and 4 grams of anhydrous oxalic acid. The charge was heated at 110° C. for 1½ hour. The melting point had decreased to below 2° C. and the product was a viscous liquid having a color of 12 (Gardner).

The invention has been described in detail for the purpose of illustration, but it will be obvious to those skilled in the art that numerous modifications and variations may be resorted to without departing from the spirit of the invention in its broadest aspects.

What is claimed is:

1. In a process for isomerizing members of the group consisting of 4-cyclohexene-1,2-dicarboxylic anhydride and 4-methyl-4-cyclohexene-1,2-dicarboxylic anhydride, said process comprising heating at least one such member at a temperature ranging from about 65° C. to about 185° C. in the presence of a catalyst system to effect isomerization; the improvement comprising using a catalyst system that contains (A) at least one member of the group consisting of boric acid and boron oxide ($B_2O_3$), and (B) at least one member of the group consisting of oxalic acid dihydrate and anhydrous oxalic acid wherein the minimum amount of (A) is 0.0066 percent and the minimum amount of (B) is 0.0066 percent, the percentages being based on the weight of the anhydride.

2. A process according to claim 1, wherein the amount of catalyst ranges from about 0.01 percent to about 2 percent of (A) and from about 0.01 percent to about 2 percent of (B), the percentages being based on the weight of the anhydride.

* * * * *